United States Patent [19]

Cassidy

[11] Patent Number: 5,025,711
[45] Date of Patent: Jun. 25, 1991

[54] SIMULTANEOUS TEMPERATURE AND MODE SELECTOR FOR HEATING AND COOLING

[75] Inventor: Donald C. Cassidy, Bloomfield Hills, Mich.

[73] Assignee: General Motors Corporation, Detorit, Mich.

[21] Appl. No.: 527,605

[22] Filed: May 23, 1990

[51] Int. Cl.⁵ .............................................. B60H 1/00
[52] U.S. Cl. .......................................... 98/208; 98/205
[58] Field of Search ...................... 98/2.05, 2.06, 2.08, 98/2.11, 2, 2.09; 237/12.3 A, 12.3 B; 165/42, 43, 16, 103

[56] References Cited

U.S. PATENT DOCUMENTS

| | | | |
|---|---|---|---|
| 1,666,569 | 4/1928 | Kelch et al. | 98/2.05 |
| 2,634,669 | 4/1953 | Greenmun | 98/2.11 |
| 2,737,874 | 3/1956 | Gallay et al. | 98/2.08 |
| 2,929,310 | 3/1960 | Getz | 98/2.06 |
| 3,082,955 | 3/1963 | Obermaier | 98/2.06 |
| 3,661,069 | 5/1972 | Grosseau | 98/2.05 |
| 4,216,822 | 8/1980 | Izumi | 165/42 |
| 4,413,550 | 11/1983 | Piano | 98/2 |
| 4,465,123 | 8/1984 | Sarsten et al. | 165/16 |

FOREIGN PATENT DOCUMENTS

| | | | |
|---|---|---|---|
| 2590848 | 6/1987 | France | 237/12.3 A |
| 0175411 | 10/1982 | Japan | 98/2.08 |

Primary Examiner—Henry Bennett
Assistant Examiner—W. Doerrler
Attorney, Agent, or Firm—R. L. Phillips

[57] ABSTRACT

In an automotive heater or air conditioner system the temperature control and the mode control for directing air flow to the desired outlet is controlled by a single actuator. A mixing chamber has inlet and outlet end walls for temperature control and mode control, respectively. Each wall has openings for air flow and has an associated rotary door for controlling air flow through the openings. The rotary doors are mounted on a common shaft for simultaneous rotation and the shaft is driven by a single actuator. A heater core is mounted in the chamber adjacent an opening in the inlet end wall. A mixer device blends hot and cold air in the chamber.

11 Claims, 2 Drawing Sheets

SIMULTANEOUS TEMPERATURE AND MODE SELECTOR FOR HEATING AND COOLING

FIELD OF THE INVENTION

This invention relates to automotive heater and air conditioner systems and particularly to such a system wherein both the temperature and the mode of operation are controllable by a single actuator.

BACKGROUND OF THE INVENTION

In automotive ventilation systems it is customary and desirable to afford both heating and cooling functions whether the cooling is accomplished by air conditioning or by ambient air. The systems operate in three modes: heating, air conditioning and defrost or defog. Each mode directs the air into the vehicle differently from the other modes. For heating mode, the air is directed to the vehicle floor; for air conditioning mode, the air is directed through instrument panel vents; and for defog/defrost mode, the air is directed onto the windshield. In any mode, a variable blend of hot and cool air is possible for temperature control and for heating and air conditioning modes unblended hot and cool air, respectively, can be selected.

In such systems it is known to provide a mixing chamber having inlet and outlet doors and a valve arrangement for controlling the proportion of hot and cold air streams entering the chamber for temperature selection and another valve arrangement for controlling the mode of air distribution from the outlet. Separate controls operate the two valve arrangements. Generally, flapper valves are used for both temperature and mode functions to selectively open or close various openings, although in some cases a rotary valve such as an apertured drum is used. Typically, a separate actuator is used for each valve or a complex linkage or cam arrangement is used to control plural valves. In any event, separate actuators are used for temperature control and mode control. Thus the use of several independently operated valves requires several actuators. Further, the valves each take up a certain amount of space and thus hinder attempts to design compact units.

For air conditioning applications it is commonplace to cool the air entering the mixing chamber by an evaporator positioned in the air stream just upstream of the mixing chamber inlets to condition all the incoming air. A heater core, inside or outside the chamber, heats only that portion of the incoming air which passes through it. The temperature control valves determine whether all, some or none of the air is heated.

SUMMARY OF THE INVENTION

It is therefore an object of the invention to provide an integrated temperature and mode selector for a vehicle ventilation system which can be operated by a single actuator. It is another object to provide such a selector which requires no space for valve movement and facilitates compactness.

The invention is carried out in an automotive heating and cooling system having means for simultaneously selecting temperature and mode comprising: an air passage having side walls and end walls, one end wall having inlet openings and the other end wall having outlet openings for air flow through the passage, a rotatable temperature control door adjacent the said one end wall for selectively controlling the airflow through the respective inlet openings, the proportion of airflow through each opening determining the temperature of the airflow through the outlet openings, a rotatable selector door adjacent the other end wall for selectively controlling the airflow through the outlet openings to determine mode, a rotatable shaft extending through the passage and drivingly coupled to both doors for simultaneous rotation with the shaft such that for any given angle of shaft rotation a predetermined combination of inlet and outlet openings will be open to control the temperature of the outlet air and the mode.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to an automotive ventilation control for selecting temperature and mode of operation. While it includes an air conditioner to provide cool air, the invention applies as well to ventilation systems having no air conditioning and using only ambient air for cooling. In either case a cooling mode directs the ambient or cooled air to outlets in the instrument panel, a heating mode directs air to floor outlets, and a defogger mode directs air to outlets at the windshield. In general, it is desired to have warm air emitted from the defogger outlets and the floor outlets and ambient or cooled air emitted from the instrument panel outlets. To optimize the comfort level, however, it is desired to vary the temperature at each outlet.

Figure 1:
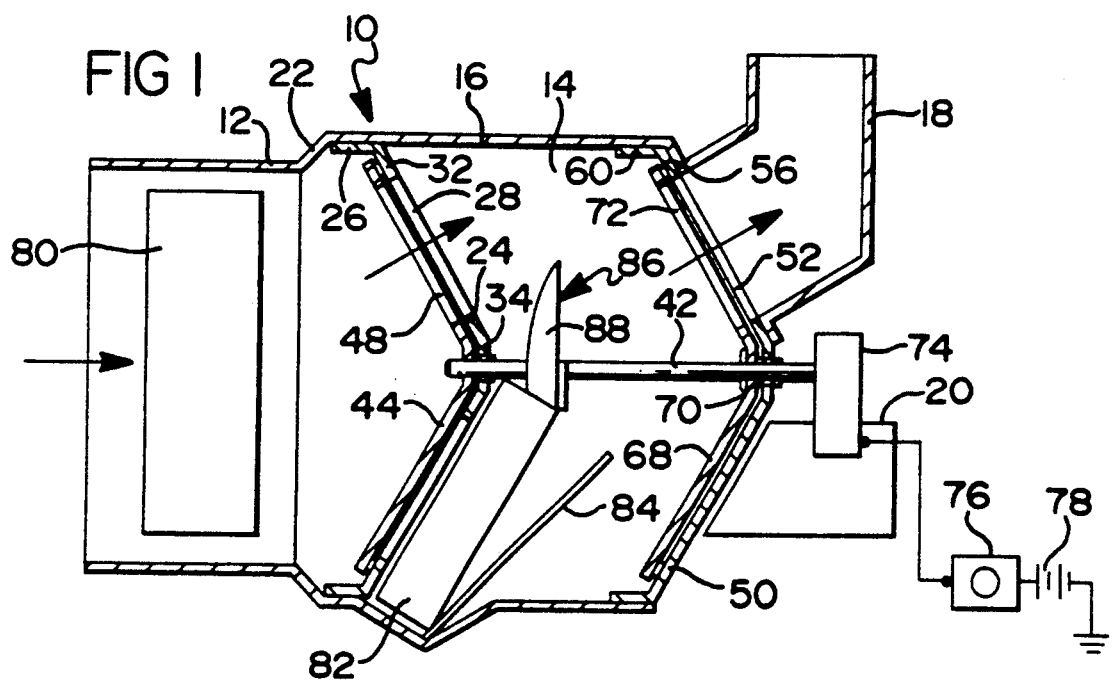
FIG. 1 is a schematic cross section of a temperature and mode selector for an automotive ventilation system, according to the invention.
Figure 2:
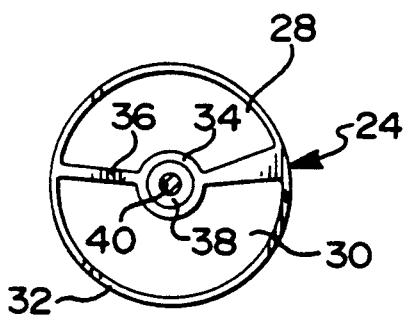
FIG. 2 is an end view of the inlet end wall of FIG. 1.

FIG. 1 shows a ventilation duct 10 having an upstream evaporator housing 12, a downstream mixing chamber 14 having side walls 16 larger in diameter than the housing 12, and outlet ducts 18 and 20 for air conditioning and defogger, respectively. An outwardly tapered portion 22 connects the housing 12 with the chamber walls 16. The upstream end of the mixing chamber 14 has an apertured frustroconical end wall 24, also shown in FIG. 2, secured to the side wall 16 by a radial flange 26. An upper opening 28 in the end wall 24 is fan shaped and has an angular extent of about 150°. A lower opening 30 in the end wall 24 is similar to the upper opening 28 but has a larger extent. The openings 28 and 30 define a rim 32, and a central hub 34 connected to the rim 32 by spokes 36. The hub 34 contains a flat center 38 containing a bore 40 in which a control shaft 42 is journaled. The upper opening 28 is the cold opening since it admits only cold air and the lower opening 30 is the hot opening since it admits air which will be heated downstream of the door.

Figure 3:
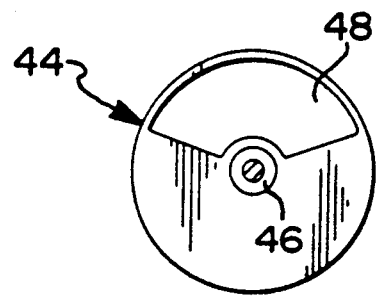
FIG. 3 is an end view of the inlet door of FIG. 1.

A frustroconical temperature control door 44 shown in FIGS. 1 and 3, has a flat center hub 46 which is mounted on the shaft 42 for rotation with the shaft. The door 44 is closely adjacent to the end wall 24 to selectively block air flow through either opening or part of both openings 28 and 30. The door 44 has an opening 48 similar in shape and size to the opening 28. The opening 48 is positioned relative to the openings 28, 30 according to the rotation of the control shaft 42 to proportion the airflow through the openings 28 and 30.

Figure 4:
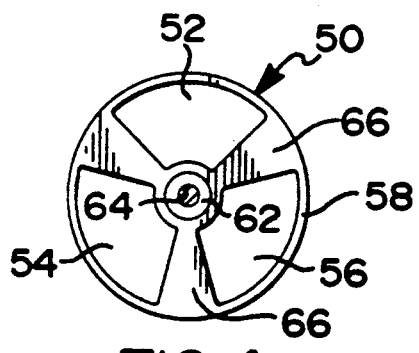
FIG. 4 is an end view of the outlet end wall of FIG. 1.

The downstream end of the mixing chamber also has an apertured frustroconical end wall 50 best shown in FIG. 4. A cooling or air conditioning opening 52 about 100° in angular extent is in the upper half of the end wall 50, while smaller openings 54 and 56 for the heater and the defogger, respectively, reside in the lower part of the wall 50. The openings define a rim 58 on the wall 50 which is connected to a radial flange 60 that is secured to the chamber wall 16. A flat central hub 62 has a bore 64 to rotatably receive the control shaft 42. The hub 62 is supported on the rim 58 by panels 66 between the openings 52, 54 and 56.

Figure 5:
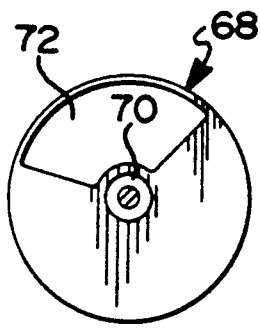
FIG. 5 is an end view of the outlet door of FIG. 1, FIGS. 6a through 6d are schematic views of the relationship of inlet and outlet door and end walls for different angles of door rotation.
Figure 6A:
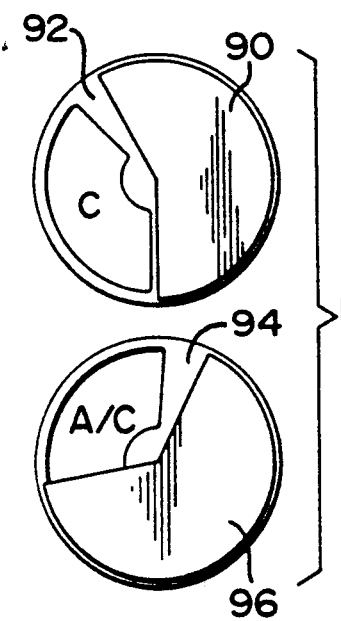
Figure 6B:
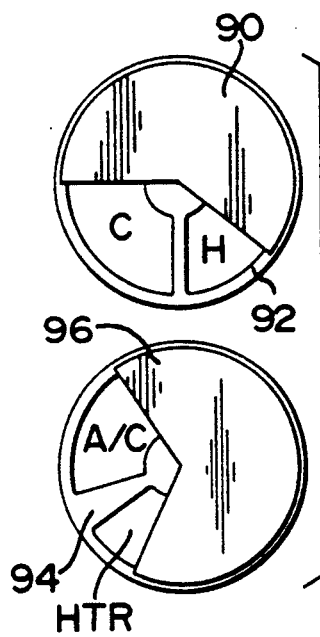
Figure 6C:
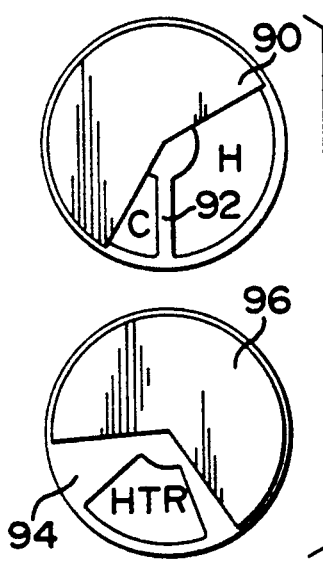
Figure 6D:
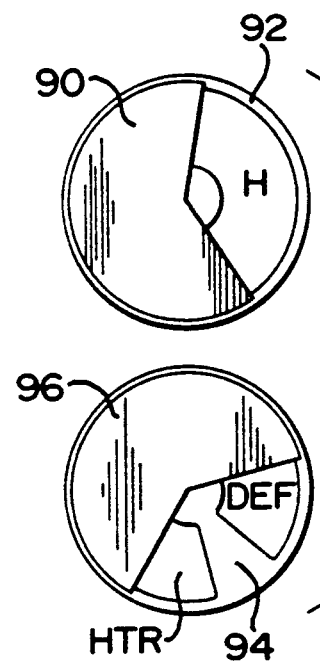

A frustroconical mode control door 68, best shown in FIG. 5, has a flat central hub 70 which is secured to the control shaft 42 for rotation with the shaft. The door is closely adjacent to the end wall 50 to direct air flow through selected openings in the end wall 50. The door 68 is similar to the door 44 in structure and operation. A single opening 72 having an angular extent of about 120° is positioned relative to the openings 52, 54 and 56 according to the rotation of the control shaft 42 to determine the mode or modes of operation. A single actuator 74 is drivingly secured to the downstream end of the control shaft 42 for rotating the shaft to a desired angular position. The actuator is shown as an electric drive which is energized by a manually positioned controller 76 in circuit with a battery 78. A manually operated mechanical actuator could be used instead.

An air conditioning evaporator 80 is mounted in the evaporator housing 12 to cool (and remove moisture from) incoming air when the air conditioning unit is operating. A heater core 82 is mounted downstream of the end wall 24 immediately adjacent the hot air opening 30 to heat the airflow which enters the opening 30. A baffle 84 downstream of the core 82 directs hot air from the core toward the center of the mixing chamber 14 for mixing with cold air flowing through the opening 28. A mixer 86 attached to a side of the core 82 near the center of the chamber extends into the upper part of the chamber to cause turbulence in the cold air stream. The mixer 86 comprises a linear array of spaced sheet metal fingers 88, each finger 88 being convex in the upstream direction. The turbulence of the cold air after passing through the fingers causes mixing with the warm air. The mixing action presupposes airflow through both openings 28 and 30.

FIG. 6, parts a–d, illustrate the effect of rotating the pair of doors together to simultaneously select temperature and mode. These Figures show door rotation in 60° increments. It is understood, however, that the doors can be rotated to any angle. The doors and end walls in this illustration are oriented differently than in FIGS. 1–5 but the principle is the same. In FIG. 6a, the opening of upstream door 90 fully uncovers the cold opening C of end wall 92 and the opening of downstream door 94 uncovers the A/C opening of end wall 96; thus the cold input air is directed to the air conditioning duct. In FIG. 6b, the door 90 uncovers portions of the cold (C) and hot (H) inlet openings while the door 96 uncovers portions of the A/C and heater (HTR) outlet openings to supply a blend of hot and cold air to both the air conditioning and the heater ducts. In FIG. 6c the door 90 uncovers only a small part of the cold inlet C and a large area of the hot inlet H, while the door 96 uncovers only the HTR opening, so that the heater duct is supplied with an air mix which is mainly hot air. Finally, FIG. 6d shows the door 90 uncovering only the hot inlet opening H and the door 96 uncovers parts of the heater opening HTR and the defroster opening DEF so that only hot air is directed to the heater and defrost ducts. It can be seen that a further counterclockwise door rotation beyond the FIG. 6d position will admit a mixture of hot and cold air to the defroster duct. Thus, although unmixed cold air can be directed to the A/C duct and unmixed hot air can be directed to the heater and defroster ducts, the temperature of air in each mode can be varied throughout a limited range.

Figure 7:
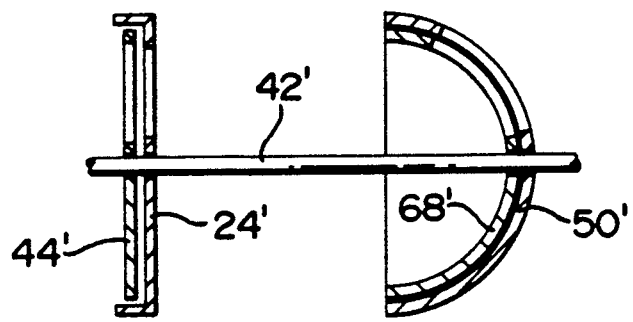
FIG. 7 is a sectional side view of another embodiment of end walls and an integral door assembly, according to the invention.

While the end walls and doors have been described as frustroconical, other surfaces of revolution may be used as well for either the inlet or the outlet or both. FIG. 7, illustrates an integral control with different shaped doors and end walls at the inlet and the outlet. The inlet end has a flat disc end wall 24' and an adjacent flat disc door 44'. The outlet end has a dome-shaped or hemispherical end wall 50' and an adjacent hemispherical door 68', the doors 44' and 68' being mounted on shaft 42' for rotation therewith.

The embodiments of the invention in which an exclusive property or privilege is claimed are defined as follows:

1. In an automotive heating and cooling system, means for simultaneously selecting temperature and mode comprising:
    an air passage having side walls and end walls,
    one end wall having inlet openings and the other end wall having outlet openings for air flow through the passage,
    a rotatable temperature control door adjacent the said one end wall for selectively controlling the air flow through the respective inlet openings, the proportion of air flow through each opening determining the temperature of the air flow through the outlet openings,
    a rotatable selector door adjacent the other end wall for selectively controlling the air flow through the outlet openings to determine mode, and
    a rotatable shaft extending through the passage and drivingly coupled to both doors for simultaneous rotation with the shaft such that for any given angle of shaft rotation a predetermined combination of inlet and outlet openings will be open to control the temperature of the outlet air and the mode.

2. The invention as defined in claim 1 wherein the inlet openings comprise a hot air opening and a cold air opening and wherein each opening is selectively closed by the temperature control door to a degree determined by the angle of door rotation for admitting air from one of the inlet openings or a blend of air from both openings 3. The invention as defined in claim 1 wherein the outlet openings comprise a heater opening, a defroster opening and a cooling opening whereby for a given angle of door rotation at least one of the outlet openings will be closed and at least one of the other of the outlet openings will be at least partially open to distribute the air according to the angle of door rotation.

4. The invention as defined in claim 2 wherein the outlet openings comprise a heater opening, a defroster opening and an air conditioner opening such that each outlet can be supplied with a variable blend of air from the inlet openings in dependence on the angle of door rotation 5. The invention as defined in claim 1 wherein at least one of the end walls and its adjacent door are frustroconical.

6. The invention as defined in claim 1 wherein at least one of the end walls and its adjacent door are flat.

7. The invention as defined in claim 1 wherein at least one of the end walls and its adjacent door are dome-shaped.

8. In an automotive heating and cooling system, means for simultaneously selecting temperature and mode comprising:
   an air passage having side walls and end walls,
   one end wall having two inlet openings for the control of hot and cold air through the passage, and the other end wall having outlet openings for heater, air conditioning and defroster modes for distributing air flow from the passage,
   heater means within the passage for heating air passing through one of the inlet openings,
   a temperature control door adjacent the said one end wall and rotatable about an axis for selectively controlling the air flow through the respective inlet openings, the proportion of air flow through each opening determining proportion of heated air to cool air to establish the temperature of the air flow through the outlet openings,
   a selector door adjacent the other end wall and rotatable about the said axis for selectively controlling the air flow through the outlet openings to determine mode, and
   a rotatable shaft extending through the passage on the axis of door rotation and attached to both doors for simultaneous rotation with the shaft such that for any given angle of shaft rotation a predetermined combination of inlet and outlet openings will be open to control the temperature of the outlet air and the mode.

9. The invention as defined in claim 8 including a mixer downstream of the heater means for mixing the air from the two inlet openings to blend heated and unheated air for uniform temperature of air flow through the outlet openings.

10. The invention as defined in claim 8 wherein an air conditioner evaporator is mounted upstream of and adjacent the inlet openings for cooling the air flow through both inlet openings.

11. The invention as defined in claim 8 wherein an actuator is drivingly coupled to the shaft for shaft rotation so that the actuator controls the temperature and mode of the heating and cooling system.

* * * * *